(12) United States Patent
Gaonkar et al.

(10) Patent No.: US 11,514,447 B2
(45) Date of Patent: Nov. 29, 2022

(54) DUPLICATE CONCURRENT TRANSACTION DETECTION

(71) Applicant: PayPal, Inc., San Jose, CA (US)

(72) Inventors: Mandar Ganaba Gaonkar, San Jose, CA (US); Anand Sengamalai, Fremont, CA (US); Serafin Trujillo, San Jose, CA (US); Kenneth Bradley Snyder, Campbell, CA (US); Changching Chi, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 21 days.

(21) Appl. No.: 16/914,054

(22) Filed: Jun. 26, 2020

(65) Prior Publication Data
US 2021/0406883 A1    Dec. 30, 2021

(51) Int. Cl.
| | |
|---|---|
| G06Q 20/40 | (2012.01) |
| G06Q 30/00 | (2012.01) |
| G06Q 20/08 | (2012.01) |
| G06F 16/23 | (2019.01) |
| G06F 16/957 | (2019.01) |
| G06F 16/2458 | (2019.01) |

(Continued)

(52) U.S. Cl.
CPC ......... *G06Q 20/40* (2013.01); *G06F 16/2379* (2019.01); *G06F 16/2462* (2019.01); *G06F 16/9574* (2019.01); *G06Q 20/085* (2013.01); *G06Q 20/10* (2013.01); *G06Q 20/4016* (2013.01); *G06Q 30/0185* (2013.01); *G06N 3/08* (2013.01)

(58) Field of Classification Search
CPC ...... G06Q 20/40; G06Q 20/085; G06Q 20/10; G06Q 20/4016; G06Q 20/401; G06F 16/2379; G06F 16/2462; G06F 16/9574
See application file for complete search history.

(56) References Cited

U.S. PATENT DOCUMENTS

| | | |
|---|---|---|
| 7,657,497 B2 | 2/2010 | Nandy |
| 8,459,551 B2 | 6/2013 | Lee et al. |

(Continued)

OTHER PUBLICATIONS

Kumar, "How to Fix Duplicate e-Commerce Transactions", Business2community.com, Nov. 2018 (Year: 2018).*

(Continued)

*Primary Examiner* — Abdulmajeed Aziz
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed relating to transaction authorization. In some embodiments, a server computer system receives and caches browsing information for a device of a user, where the browsing information relates to a transaction service. The server computer system may then receive a request to authorize one or more transactions via the transaction service. The server computer system may evaluate the cached browsing information to determine whether the user is attempting to perform multiple concurrent transactions via the transaction service. Based on the evaluating, the server computer system may determine whether to authorize the one or more transactions. In some embodiments, the disclosed techniques may advantageously prevent or reduce authorization of duplicate transactions that are concurrently attempted by a user.

20 Claims, 7 Drawing Sheets

Method 600

```
┌─────────────────────────────────────────────────────────┐
│ Execute, upon load of one or more browser windows via    │
│ the user computing device, a script for collecting       │
│ browser-based data.                                      │
│                          610                             │
└─────────────────────────────────────────────────────────┘
                            │
                            ▼
┌─────────────────────────────────────────────────────────┐
│ Generate, based on the executing, browsing information   │
│ relating to a transaction service.                       │
│                          620                             │
│ ┌─────────────────────────────────────────────────────┐ │
│ │ Increment a counter based on one or more browser    │ │
│ │ tabs that are associated with the transaction       │ │
│ │ service being open on the user computing device.    │ │
│ │                       630                           │ │
│ └─────────────────────────────────────────────────────┘ │
└─────────────────────────────────────────────────────────┘
                            │
                            ▼
┌─────────────────────────────────────────────────────────┐
│ Transmit, to a server computer system, the browsing      │
│ information, where the server computer system            │
│ determines whether a user is attempting to perform       │
│ multiple concurrent transactions via the transaction     │
│ service based on evaluating the browsing information.    │
│                          640                             │
└─────────────────────────────────────────────────────────┘
```

(51) Int. Cl.
*G06Q 20/10* (2012.01)
*G06N 3/08* (2006.01)

(56) References Cited

U.S. PATENT DOCUMENTS

| | | | | |
|---|---|---|---|---|
| 8,548,858 | B2 | 10/2013 | May et al. | |
| 10,691,750 | B1* | 6/2020 | Karppanen | G06F 16/9574 |
| 11,005,839 | B1* | 5/2021 | Shahidzadeh | H04W 12/06 |
| 2008/0010678 | A1* | 1/2008 | Burdette | G06Q 30/0603 |
| | | | | 726/15 |
| 2012/0192080 | A1* | 7/2012 | Lloyd | G06F 16/9577 |
| | | | | 715/744 |
| 2014/0214671 | A1* | 7/2014 | Desilva | G06Q 20/405 |
| | | | | 705/44 |
| 2014/0279793 | A1* | 9/2014 | Wohlstadter | G06N 5/04 |
| | | | | 706/46 |
| 2016/0352695 | A1* | 12/2016 | Kozolchyk | H04L 67/1097 |
| 2017/0169431 | A1* | 6/2017 | Groarke | G06Q 20/4016 |
| 2018/0145998 | A1* | 5/2018 | Shaikh | H04L 63/1425 |
| 2019/0066111 | A1* | 2/2019 | Bizarro | G06Q 20/34 |
| 2021/0034760 | A1* | 2/2021 | Banga | H04L 67/02 |
| 2021/0304242 | A1* | 9/2021 | Benkreira | H04W 4/12 |

OTHER PUBLICATIONS

FraudNet, PayPal, Inc., https://developer.paypal.com/docs/limited-release/fraudnet/; accessed May 13, 2020, 1 page.

* cited by examiner

DUPLICATE CONCURRENT TRANSACTION DETECTION

BACKGROUND

Technical Field

This disclosure relates generally to processing electronic transactions, and, more specifically, to techniques for evaluating browsing information for a user device requesting authentication of one or more transactions, e.g., for transaction security.

Description of the Related Art

Fraudulent electronic transactions may cause substantial loss and security vulnerabilities for a transaction service. As one specific example, a user may attempt multiple concurrent electronic monetary transactions via the transaction service. In this example, the user's transaction account may not have sufficient funds to cover the total amount of the multiple concurrent transactions. Such a user may be a malicious user that is attempting to complete fraudulent transactions. In some situations, duplicate transactions may be attempted by opening multiple browser windows or browser tabs for the same type of transaction with a transaction service. In these situations, the user may then request authorization of the duplicate transactions nearly simultaneously. These authorizations may result in a timing error by the transaction service that permits processing of multiple ones of these duplicate transactions.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "server computer system configured to evaluate cached browsing information" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

DETAILED DESCRIPTION

Techniques are disclosed for processing electronic transactions for a transaction service based on evaluating browsing information for a device of a user requesting authorization of the electronic transactions. In disclosed techniques, a server computer system may determine whether the user requesting authorization is attempting to perform multiple concurrent transaction via a transaction service. "Concurrent" transactions are those which are initiated simultaneously or nearly simultaneously from a particular device of a user. Two nearly simultaneous transactions may not be submitted at the exact same time, but may, for example, be submitted within e.g., a few seconds of one another. In some situations, transactions that are submitted concurrently may be duplicate transactions. Traditional transaction processing may not identify that these concurrent transactions are duplicates due to timing issues and, therefore, may unknowingly authorize one or more duplicate transactions which may turn out to be fraudulent. For example, offline detection models may evaluate transaction data, but this evaluation does not occur until after a request for one or more transactions is received.

In contrast, in disclosed embodiments, browsing information for a user device that is associated with a transaction service may be evaluated beginning prior to a request to authorize one or more transactions being received. This process may involve one or more evaluations, and may be referred to in some cases as "continuous" evaluation of browsing information. Moreover, these evaluations may be performed in real time such that the results of the evaluations are available nearly instantaneously. As used herein, the term "real-time" refers to evaluation of transactions within a threshold amount of time of receiving a request for a transaction such that the results of the evaluation are available nearly immediately after the request is received. For example, the results may be available within milliseconds.

The disclosed techniques include detection of multiple browser tabs by creating unique identifiers (IDs) for individual tabs. That is, each time a new browser tab is opened, a unique identifier is assigned to that tab in order to keep track of the number of tabs running on a given device. In this way, even if multiple tabs in a web browser are executing the same uniform resource locator (URL), these tabs will be evaluated (e.g., counted) individually. This browsing information is collected on the user device and may be transmitted as it is generated (e.g., as browser tabs are opened) or may be transmitted in groups (e.g., after three new browser tabs have been opened) to a server computer system for processing. A risk evaluation performed by the server computer system based on browsing information may be performed in real-time, for example, such that as new pieces of browsing information are received from the user computing device the evaluation of this data is refined. The real-time reception of browsing information as well as the evaluation of this information may be performed by server computer system prior to a user requesting to authorize one or more transactions. In other situations, evaluation by server computer system is performed after receiving an authorization request, but within some threshold amount of time (e.g., within a few seconds or milliseconds of receiving the authorization request). Based on evaluating this information, the disclosed server computer system determines whether to authorize one or more transactions requested by a user of the user device.

In some situations, the disclosed techniques may improve detection of duplicate electronic monetary transaction by evaluating browser information that is cached prior to a user requesting authorization of such transactions. This detection may advantageously prevent or reduce a number of electronic monetary transactions attempted from accounts that do not contain sufficient funds. Consider a scenario in which a user submits multiple transactions of a particular type (e.g., "person-to-person" transactions in which one individual is transferring funds to another individual—these transactions may have different rules and fees than other transaction types). If these transactions are submitted within a few seconds of one another, the disclosed server computer system will evaluated cached browsing information for this user's device to determine whether the browser tabs from which these transactions were submitted are executing matching URLs (e.g., to determine whether the user is submitting duplicate person-to-person payment transactions at approximately the same time). As used herein, the term "match" refers to a determination that two entities are similar to within some threshold extent. For example, two URLs may have the same domains, but one or more portions of the overall URL may differ. In some situations, however, two URLs may be said to match when they are identical.

Example Transaction Processing

Figure 1:
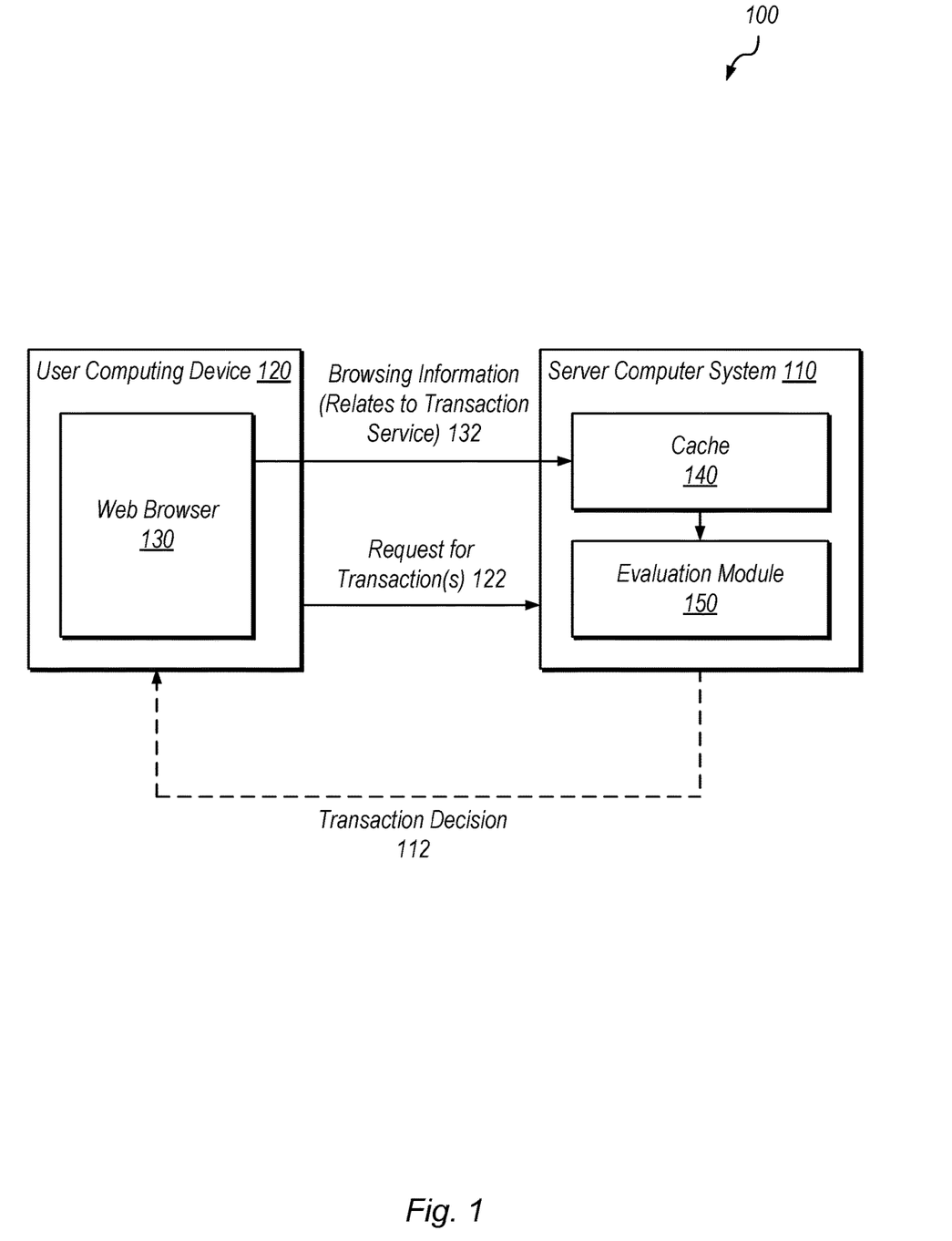
FIG. 1 is a block diagram illustrating an example system configured to process transactions based on browsing information, according to some embodiments.

FIG. 1 is a block diagram illustrating an example system configured to process transactions based on browsing information. In the illustrated embodiment, system 100 includes server computer system 110 and user computing device 120.

Server computer system 110, in the illustrated embodiment, is configured to operate cache 140 and evaluation module 150 in processing transaction requests. Specifically, server computer system 110 is configured to cache browsing information 132 received from user computing device 120. In some embodiments, the browsing information is related to a particular transaction service. PAYPAL is one non-limiting example of a transaction service. Note that a transaction service may be any computer system that facilitates performance of transactions. Server computer system 110 may be a PAYPAL transaction processing server. Based on receiving a request 122 to authorize one or more transactions, server computer system 110 is configured to execute evaluation module 150 to evaluate cached browsing information stored in cache 140. In some embodiments, server computer system 110 provides a transaction decision 112 to user computing device 120 based on a risk determination performed at evaluation module 150.

Transaction decision 112 may specify whether request 122 is approved by server computer system 110. In situations where request 122 is denied, transaction decision 112 may specify one or more reasons for the rejection. In some embodiments, transaction decision 112 includes confirmation information for a transaction. For example, such confirmation information may specify that an electronic monetary transfer has been authorized as well as a shipment date for a purchased product. User computing device 120 may display transaction decision 112 to a user via a user interface, for example.

Evaluation module 150 may perform an evaluation of request 122 based on browsing information 132 stored in cache 140. For example, evaluation techniques implemented by evaluation module 150 include application of various authentication rules. As part of applying authentication rules, evaluation module 150 may determine whether web browser 130 has multiple open and active browser tabs. In addition, evaluation techniques may include determining whether multiple open and active browser tabs are executing matching URLs. Such evaluation techniques are discussed in further detail below with reference to FIG. 2.

Cache 140 may be a software or hardware cache that is operable to store browsing information for ease of accessibility. For example, server computer system 110 may be able to quickly process transaction requests from various user computing devices using information stored in cache 140. In some embodiments, the contents of cache 140 is persisted in a database once server computer system has processed one or more transaction requests associated with browsing information stored in the cache. As discussed below with reference to FIG. 3, the browsing information stored in cache 140 may be raw browsing data or may be information that is preprocessed by server computer system 110 prior to storage.

User computing device 120, in the illustrated embodiment, includes web browser 130. User computing device 120 may be a desktop, laptop, tablet, etc., while web browser 130 may be any of various types of search engines such as SAFARI, CHROME, INTERNET EXPLORER, etc. Web browser 130 may execute one or more browser windows, as well as various browser tabs within these browser windows for a user of user computing device 120. In some embodiments, when a URL of a transaction service is run within a browser tab of web browser 130, a script is executed. As discussed below with reference to FIG. 5, this script may collect browsing information 132 that indicates activity of a user relative to the transaction service. Based on the user attempting one or more transactions with the transaction service via web browser 130, user computing device 120 sends a request to authorize the one or more transactions to server computer system 110.

In some embodiments, request 122 for one or more transactions attempted by a user at user computing device 120 specifies one or more electronic monetary transactions. For example, a user may be attempting a person-to-person transaction, a transaction with a merchant, an electronic transfer between two accounts, or any of various transaction types for online monetary transactions. That is, person-to-person transactions are a particular transaction type, while transactions between a consumer and a merchant are another, different transaction type. There may be different categories of transactions which may be processed differently due to some transactions having different fees or requirements, for example. In some embodiments, disclosed transaction evaluation techniques may advantageously improve transaction security by detecting suspicious activity earlier, which in turn may reduce the number of fraudulent transactions being authorized. Early detection may be performed by collecting browsing information from various user devices prior to receiving transactions requests, for example.

Example Browsing Information Evaluation

Figure 2:
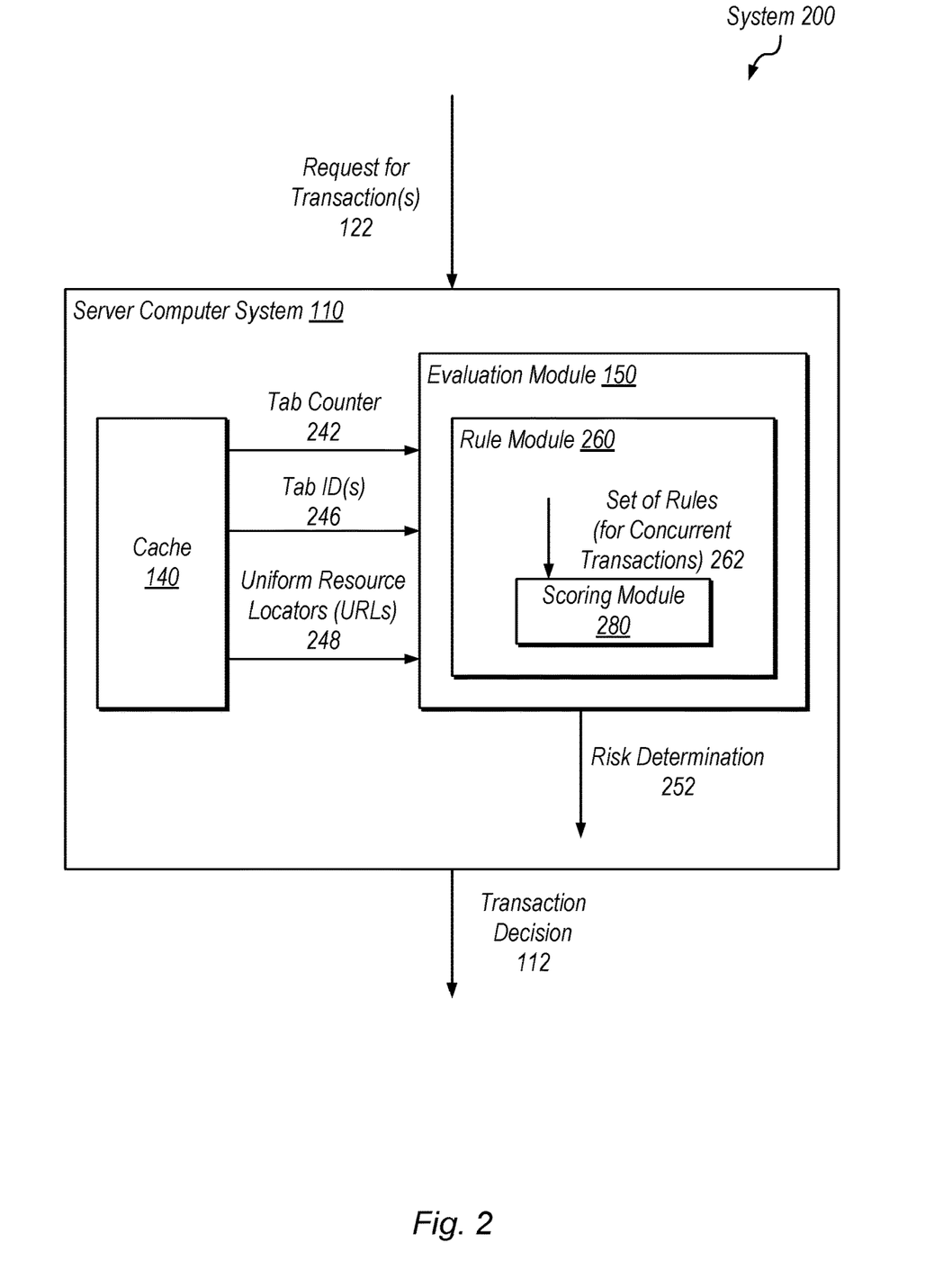
FIG. 2 is a diagram illustrating an example server computer system configured to evaluate browsing information, according to some embodiments.

FIG. 2 is a diagram illustrating an example server computer system configured to evaluate browsing information. In the illustrated embodiment, evaluation module 150, included in server computer system 110, which in turn is included in system 200, executes a rule module 260 as part of a risk determination for one or more transactions.

Figure 3:
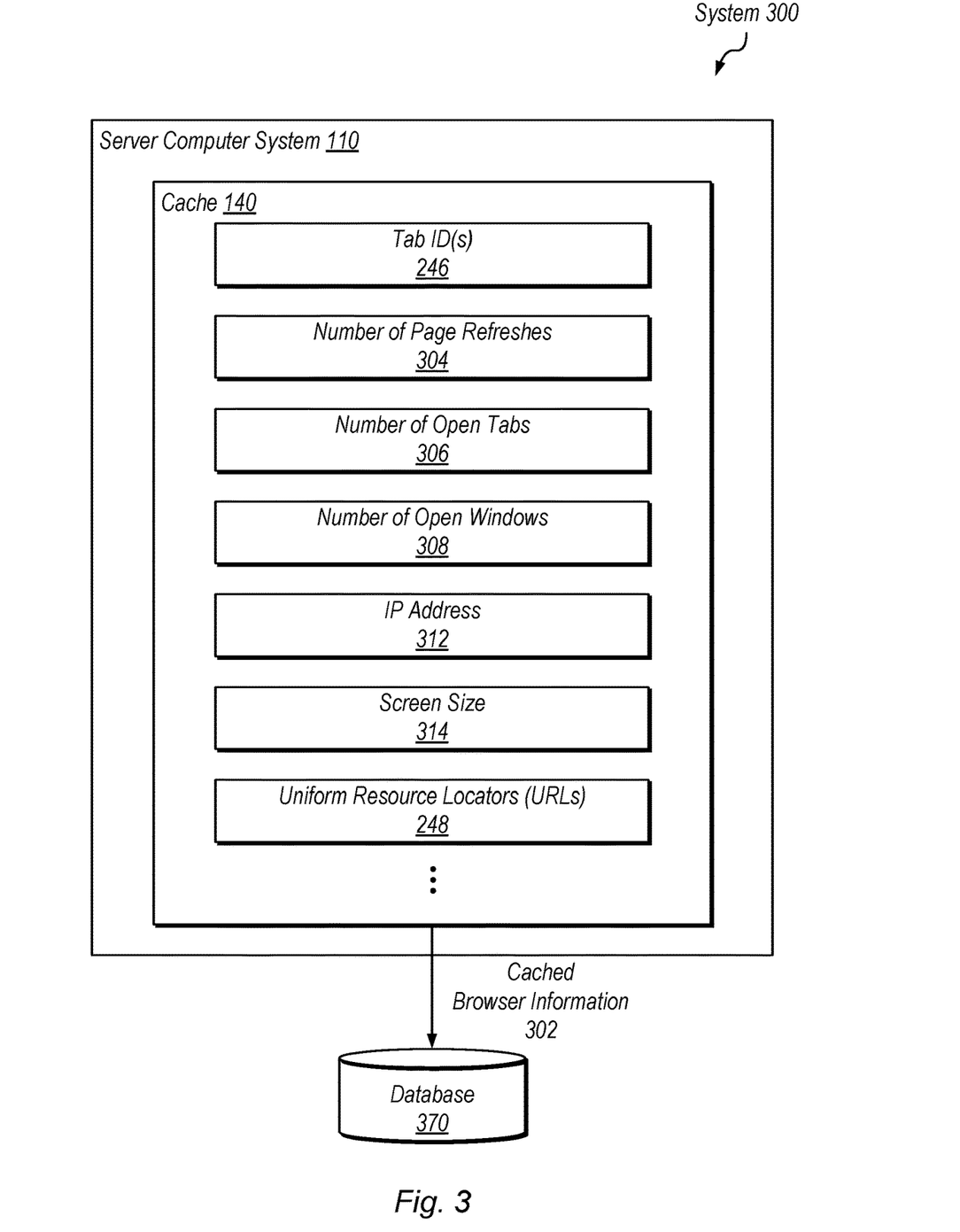
FIG. 3 is a block diagram illustrating an example cache, according to some embodiments.

Cache 140 is executable to provide various browsing information to evaluation module 150, including a counter 242, one or more tab IDs 246, and one or more URLs 248. In some embodiments, server computer system 110 transmits additional browsing information to evaluation module 150. Example browsing information stored by cache 140 is shown in FIG. 3.

A tab counter 242 transmitted to evaluation module 150 specifies a number of open (and active) browser tabs within web browser 130 on device 120. For example, if a user opens three different tabs in a first browser window and two different tabs in a second browser window, then tab counter 242 may specify that 5 different browser tabs are open on user computing device 120. Tab IDs 246 may include unique identifiers for each tab open in web browser 130 on device 120. URLs 248 stored in cache 140 include various URLs that are executed within web browser 130 to access various websites. For example, a user of device 120 may access a checkout webpage of a merchant, and a URL for accessing this webpage is then stored in cache 140. In some embodiments, tab counter 242 is maintained by system 110. For example, system 110 may increment or decrement (or both) counter 242 based on a new browser tab being opened on device 120 or based on a user closing a tab on the device. In some situations, system 110 decrements counter 242 based on a session timeout in an opened browser tab on device 120.

Evaluation module 150, in the illustrated embodiment, is operable by server computer system 110 to make a risk determination 252 using rule module 260. Risk determination 252 may, for example, specify whether a transaction is fraudulent or not. Rule module 260 evaluates browsing information for user computing device 120 based on a set 262 of rules for transactions that are attempted concurrently. In some embodiments, the set 262 of rules includes rules for determining whether two transactions are concurrent transactions. For example, if two transactions are initiated within five seconds of one another, then evaluation module 150 may consider these transactions concurrent. The rules as well as browsing information stored in cache 140 are used by scoring module 280 to determine a risk score for one or more transactions included in request 122. For example, a risk score of 20 on a scale from 0 to 100 (with 100 being the most risk) may indicate that two transactions are likely not duplicates of one another (or are not concurrent) and, therefore, may not be fraudulent. Note that this is one non-limiting example of scoring that may be performed by scoring module 280 and that any of various scoring techniques may be used to score transactions. In some embodiments, scoring module 280 determines a score based on one or more rules included in set 262 being satisfied. For example, if tab counter 242 satisfies a tab threshold, then scoring module may assign a higher risk score to this transaction than to other transactions whose tab counters 242 do not satisfy the threshold. The tab threshold may be two, for example.

Based on the risk score output by scoring module 280, evaluation module generates risk determination 252. In some embodiments, risk determination 252 is performed based on the risk score satisfying a risk threshold. For example, consider a risk threshold of 60. In this example, transactions with risk scores higher than 60 may be flagged as fraudulent during risk determination 252. In the illustrated embodiment, server computer system 110 outputs a transaction decision 112 for one or more requested transactions based in risk determination 252.

In some embodiments, evaluation module 150 includes a machine learning classifier that outputs classifications for one or more transactions. This classifier may perform risk determination 252 by predicting a classification for a given transaction. As one specific example, risk determination 252 may provide a prediction of whether a payment transaction is fraudulent. The machine learning classifier included in evaluation module 150 may be trained based on various prior labeled transactions and set 262 of rules. For example, server computer system 110 may train evaluation module 150 using various prior transaction requests and known labels for these transactions indicating whether they are fraudulent or not. In addition, the training of evaluation module 150 using machine learning techniques may involve training based on browsing information for prior transactions. The machine learning classifier may be trained using any of various machine learning techniques, including: decision trees, Naïve Bayes, neural networks, k-Nearest Neighbor (kNN), etc.

In some embodiments, set 262 of rules includes a rule specifying that two concurrently attempted transactions cannot have matching URLs. For example, if two concurrent transactions are initiated for the exact same person-to-person electronic monetary transaction, then scoring module 280 will assign a risk score indicating fraud to these transactions (in which case they will likely be denied).

As one specific example of the scoring performed by scoring module 280 using set 262 of rules, a user may open a webpage via web browser 130 for sending a payment to another user. Upon load of the webpage in browser 130, device 120 sends a tab counter 242 of one to system 110 which is then provided to evaluation module 150. Based on receiving a request from the user of device 120 to authorize a first payment transaction within the open browser tab, system 110 executes evaluation module 150 to generate risk determination 252 for this payment transaction. In this example, because the user is only submitting one transaction, system 110 approves the transaction and provides transaction decision 112 to user computing device 120 letting the user know that their transaction has been approved. Once the first payment transaction is authorized, the user returns to the webpage for sending payment transactions (e.g., from a payment confirmation page for the first transaction) and submits a second payment transaction for processing. In this example, the user submits both requests in the same online session within the same browser tab at different times. Although the payment requests were submitted from the same URL, scoring module 280 assigns a low risk score to both the first and second transactions. The risk determination 252 for these transactions indicates that these are not fraudulent transactions due to the first transaction being authorized (and completed) prior to submission of the second transaction from the same browser tab. Said another way, this example activity is not flagged as fraudulent by server computer system 110.

As another specific example, scoring module 280 may score a request for multiple transactions as highly risky, if counter 242, tab IDs 246, and URLs 248 indicate that multiple bowser tabs are open on device 120 with the same URL. This URL may facilitate person-to-person payment transactions, for example. In this example, if a user is attempting multiple person-to-person payment transactions concurrently, then server computer system 110 will deny the multiple transactions. In this example, denial of the multiple transaction may advantageously prevent a user from attempting to send more money than they have available in their payment account with the transaction service. For example, a user inputs a URL for sending money to a friend into two different browser tabs and then attempts to send $10 in each of the tabs (i.e. a total of $20), but their payment account balance is only $10. In this example situation, if server computer system 110 had not denied the transaction requests, then the user would have gotten away sending $10 more than they actually possess. This situation may occur when a user enters the same URL into multiple different browser windows and requests authorization. In such situations, server computer system 110 would detect duplicate concurrent transactions and deny user transaction requests.

As yet another specific example, a user may complete a person-to-person payment transaction in a first tab, close this tab and open a new tab, and then complete a second, person-to-person payment transaction in the new tab. Because the first transaction was authorized and complete prior to the user requesting authorization of the second transaction, in this example, the server computer system 110 approves the second transaction request. In another example, a user may open a web page in order to send money to a friend (via a person-to-person payment transaction) in a particular tab, refresh the tab multiple times, and then request authorization to send money. Set 262 of rules may indicate that multiple refreshes do not indicate duplicate transactions, for example. In this scenario, server computer system 110 would approve the requested transaction.

A further example includes the situation where a user launches a first web page in a first tab for sending money to a friend and a second webpage in a second, different tab for purchasing an item from a merchant. In this situation, the user may request authorization to send money and to purchase the item concurrently. Based on set 262 of rules, system 110 approves these two concurrent transactions because they are not duplicates and, therefore, may not be fraudulent.

As another example, if a user opens a web page for sending money, manipulates the payload transmitted from web browser 130 to server computer system 110, and then requests authorization for sending money, this request will be denied by system 110. In the PAYPAL context, the payload may be the FraudNet payload. During evaluation of the transaction, there may be a checksum failure due to the payload manipulation. In some situations, a user may turn off JavaScript in their web browser before attempting a transaction. In such situations, system 110 will deny transaction requests transmitted from this web browser due to the missing script payload. Note that the script used to gather browsing information at web browser 130 is discussed in further detail below with reference to FIG. 4.

Example Cache

FIG. 3 is a block diagram illustrating an example cache. In the illustrated embodiment, system 300 includes server computer system 110 configured to implement cache 140 and a database 370 configured to store browser information.

Cache 140, in the illustrated embodiment, includes various browsing information: tab IDs 246, a number of page refreshes 304, a number of open tabs 306, a number of open windows 308, an IP address 312 of user computing device 120, screen size 314 of one or more screens included in user computing device 120, one or more URLs 248, etc. Note that this is not an exhaustive list and that any of various browsing information for web browser 130 may be stored in cache 140. As discussed below with reference to FIG. 4, the browsing information stored in cache 140 provides information that was gathered by a script running on web pages executed via web browser 130. The browsing information may be gathered from the time that a web page is launched until the browser tab executing the web page is terminated (e.g., the tab is closed or the session times out).

As discussed above, tab IDs 246 uniquely identify one or more browser tabs opened via web browser 130 on device 120. These tab IDs 246 include unique identifiers of both active (e.g., currently displaying a web page) and terminated (e.g., closed or timed out) browser tabs. Number of page refreshes 304 may be a counter that tracks the number of times a user refreshes a given web page within a particular browser tab. For example, if a user refreshes a particular web page three times before submitting a transaction request, then the number of page refreshes 304 specified in the browsing information transmitted from device 120 to system 110 will be three. In some embodiments, number of open tabs 306 specifies the number of tabs that are currently open in web browser 130 at a given point in time. In other embodiments, number of open tabs 306 specifies the total number of tabs that have been opened by a user in web browser 130 from launch of the browser until the user closes the browser (e.g., during a particular browser session). Number of open windows 308 is similar to the number of open tabs, in that it tracks either the number of windows open at a given time in web browser 130 or the total number of windows opened by a user from launch of the browser to close of the browser.

IP address 312 specifies the internet protocol address of the of user computing device 120, while screen size 314 specifies the size of a screen used by device 120 to display web pages. Any of various other hardware or software specifications, or both, for device 120 may be included in the browsing information stored in cache 140. URLs 248, as discussed above specify one or more web resources accessed by a user via device 120 during a given browser session, for example.

In some embodiments, the browsing information stored in cache 140 is raw browsing data received directly from device 120. In other embodiments, the browsing information stored in cache 140 includes information that has been processed by system 110 in some way. For example, server computer system 110 may determine an aggregated count for the number of open tabs 306 for web browser 130, based on individual tab counts gathered for different browser windows open within browser 130. That is, if web browser 130 has three browser windows open with two, five, and seven tabs open, respectively, then the raw browsing information transmitted to system 110 may specify three different counts: two, five, and seven. System 110 may then determine that the total open tab count for browser 130 is fourteen. In some embodiments, system 110 determines domains included in URLs 248 and stores these domains in cache 140.

Database 370 is operable, by server computer system 110 to store persisted browsing information 302 from cache 140. Database 370 may be any of various types of computing resources utilized for storage. In some situations, the browsing information stored in database 370 may be used in future statistical analysis for various transactions. For example, server computer system 110, or some other server, may perform statistical analysis to determine a percentage of fraudulent transactions. Such an analysis may be performed for a particular user or may be performed for various users a transaction service.

Note that various examples herein involve classification of transactions as fraudulent or not, but these examples are discussed for purposes of explanation and are not intended to limit the scope of the present disclosure. In other embodiments, any of various classifications may be implemented.

Example User Computing Device

Figure 4:
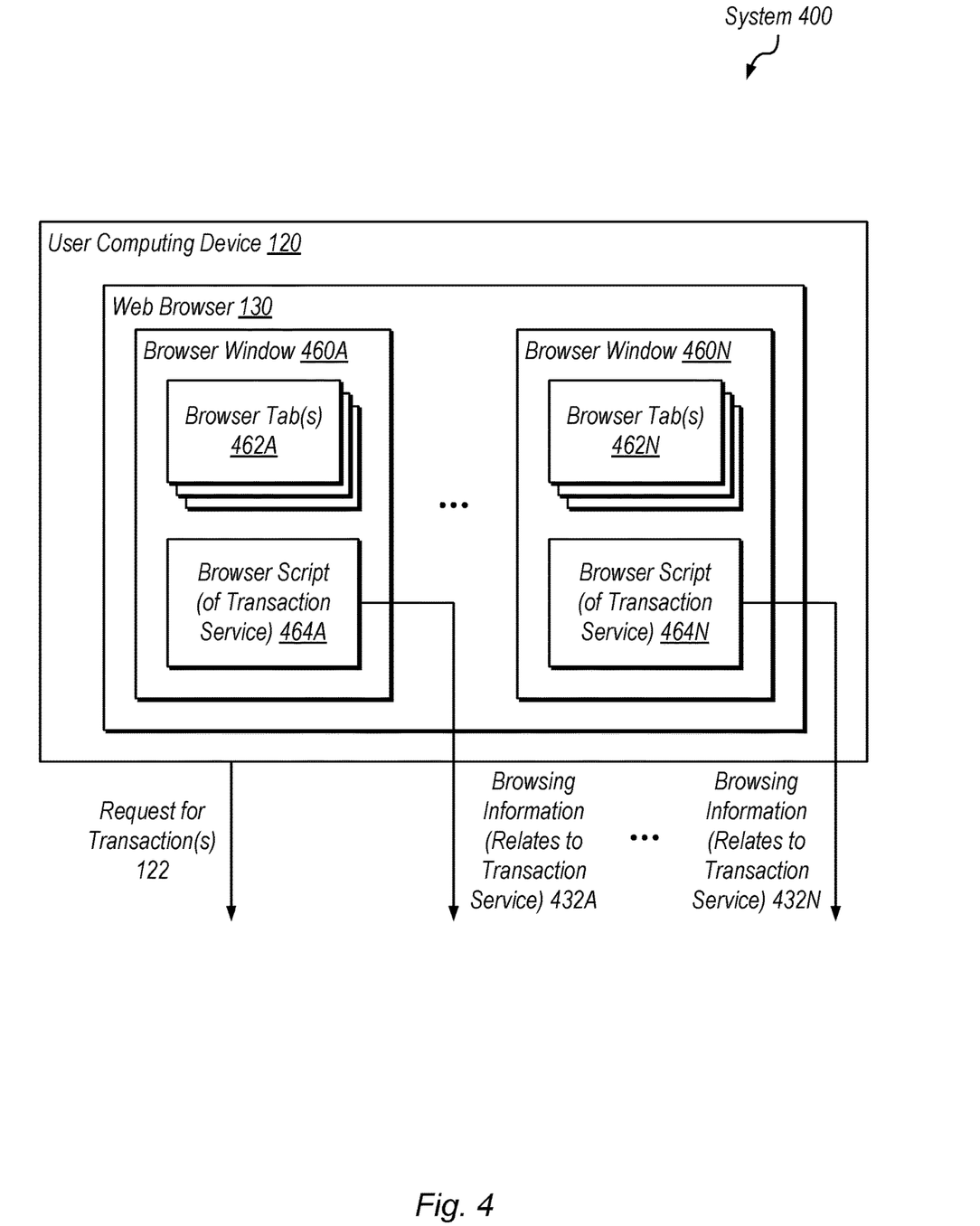
FIG. 4 is a block diagram illustrating an example user computing device configured to collect and transmit browsing information, according to some embodiments.

FIG. 4 is a block diagram illustrating an example user computing device configured to collect and transmit browsing information. In the illustrated embodiment, system 500 includes user computing device 120, which in turn operates various browser windows 460A-N via web browser 130.

Browser windows 460A-460N, in the illustrated embodiment, include respective sets of open browser tabs 462A-462N. For example, browser window 460A may have two open browser tabs 462A, while browser window 460B may have a single open browser tab 462B. In the illustrated embodiment, browser scripts 464A-464N are run within browser windows 460A-460N based on these windows executing URLs associated with a transaction service. In the illustrated embodiment, browser scripts 464 are executable to transmit browsing information 432 gathered for browser windows 460 relating to the transaction service to server computer system 110.

In some embodiments, these scripts are executable to transmit this information upon a request 122 to authorize one or more transactions. For example, if a user opens two tabs 462A within browser window 460A, enters two URLs associated with the transaction service, and submits two concurrent transaction requests (one in each browser tab), then browser script 464A is executable to transmit browsing information 432A associated with these transaction requests to system 110 for evaluation. That is, browser scripts 464 identify unique tabs open in browser windows 460 and send this information to server computer system 110. Based on this information, system 110 may sum the number of tabs according to various criteria. For example, system 110 may determine the unique number of tabs that are open and executing the same URL. With this information, system 110 evaluates one or more transaction requests using evaluation module 150 as discussed above with reference to FIG. 2.

Note that browser scripts 464A and 464N are associated with the same transaction service. In the PAYPAL context, browser scripts 464 are a JavaScript library called FraudNet that is embedded into a merchant's web page in order to collect browser-based data. For example, the browser-based data may be transmitted upon checkout for security assessment.

Example Methods

Figure 5:
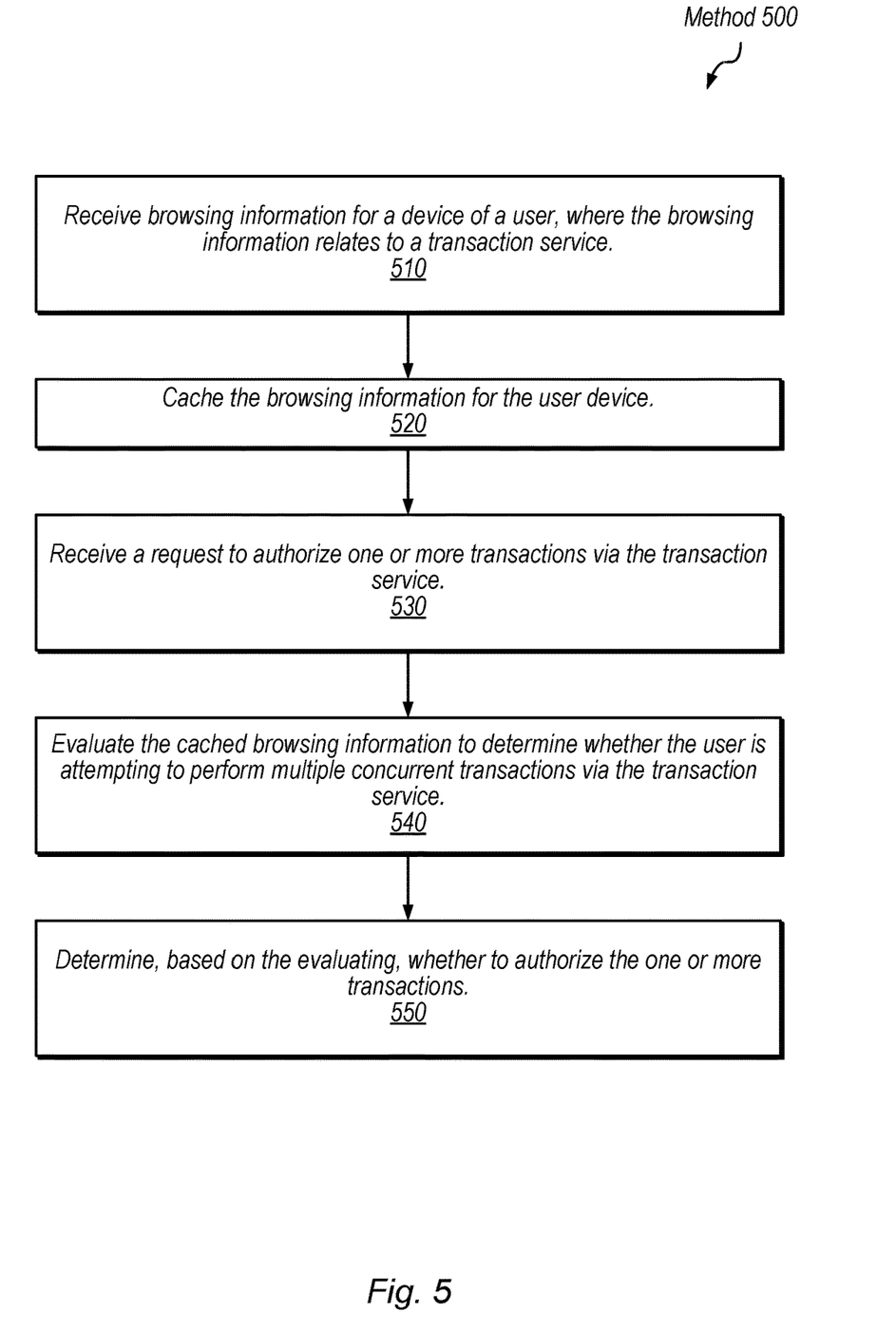
FIG. 5 is a flow diagram illustrating a method for determining whether to authorize one or more requested transactions based on evaluating cached browsing information, according to some embodiments.

FIG. 5 is a flow diagram illustrating a method for determining whether to authorize one or more requested transactions based on evaluating cached browsing information, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The following elements may be performed by server computer system 110, for example.

At 510, in the illustrated embodiment, a server computer system receives browsing information for a device of a user, wherein the browsing information relates to a transaction service.

At 520, the server computer system caches the browsing information for the user device. In some embodiments, the browsing information is received from a script running on the user device. In some embodiments, the script is run on the user device upon load of one or more browser windows. In some embodiments, the server computer system stores the cached browsing information in a database, where the information stored in the database is used for statistical analysis of the one or more transactions requested by the user device.

At 530, the server computer system receives a request to authorize one or more transactions via the transaction service. In some embodiments, the transactions are electronic monetary transactions.

At 540, the server computer system evaluates the cached browsing information to determine whether the user is attempting to perform multiple concurrent transactions via the transaction service. In some embodiments, the server computer system determines that the multiple transactions are concurrent based on the transactions being attempted within a threshold amount of time. In some embodiments, the evaluating includes incrementing a counter based on the user opening a new browser tab in a browser window. In some embodiments, based on the counter satisfying a tab threshold, evaluating a set of transaction authorization criteria associated with the transaction service.

In some embodiments, the evaluating includes decrementing a counter based on at least one of: the user closing a tab that was open in a browser window or a session timeout in an open tab. In some embodiments, the evaluating includes determining, based on the cached browsing information indicating a plurality of uniform resource locators (URLs), whether at least two of the URLs match. In some embodiments, based on determining that the user has multiple browser tabs open with the transaction service, the server computer system determines whether the user is attempting to perform multiple transactions via the multiple browser tabs within a threshold amount of time. For example, the system may determine whether a user is attempting to purchase an item from the same merchant multiple times in different tabs near-simultaneously. The system may detect that the user is attempting duplicate transactions and may flag these transactions as fraudulent.

In some embodiments, the evaluating includes determining, based on a subset of an expected set of information missing from the cached browsing information, that the script was not run on at least one of the one or more browser windows. In some embodiments, based on the determining, the system denies the request to authorized one or more transactions.

At 550, the computer system determines, based on the evaluating, whether to authorize the one or more transactions. In some embodiments, the server computer system determines that at least two uniform resource locators (URLs) executed via two different browser tabs correspond to the transaction service. In some embodiments, the server computer system determines transaction types associated with the two URLs. In some embodiments, the server computer system denies, based on the transaction types for the two URLs being the same, the request for the one or more transactions.

In some embodiments, the request is for at least two transactions and the server computer system approves the request to authorize the at least two transactions. In some embodiments, the request is approved based on the cached browsing information indicating that the at least two transactions are initiated from two different browser windows having uniform resource locators (URLs) that do not match. In some embodiments, the system approves the request based on the two transactions being initiated from two different tabs in a single browser window executing two different uniform resource locators (URLs).

In some embodiments, the request is for multiple transactions. In some embodiments, the server computer system identifies that at least two URLs executed via two different browser tabs are the same. In some embodiments, the system determines that the multiple transactions are attempted within a threshold amount of time. In some embodiments, the system denies, based on the identifying and the determining, the request for the multiple transactions. In some embodiments, the system stores the cached browsing information in a database. In some embodiments, the system performs statistical analysis of one or more transactions requested by the user device based on the information stored in the database.

Figure 6:
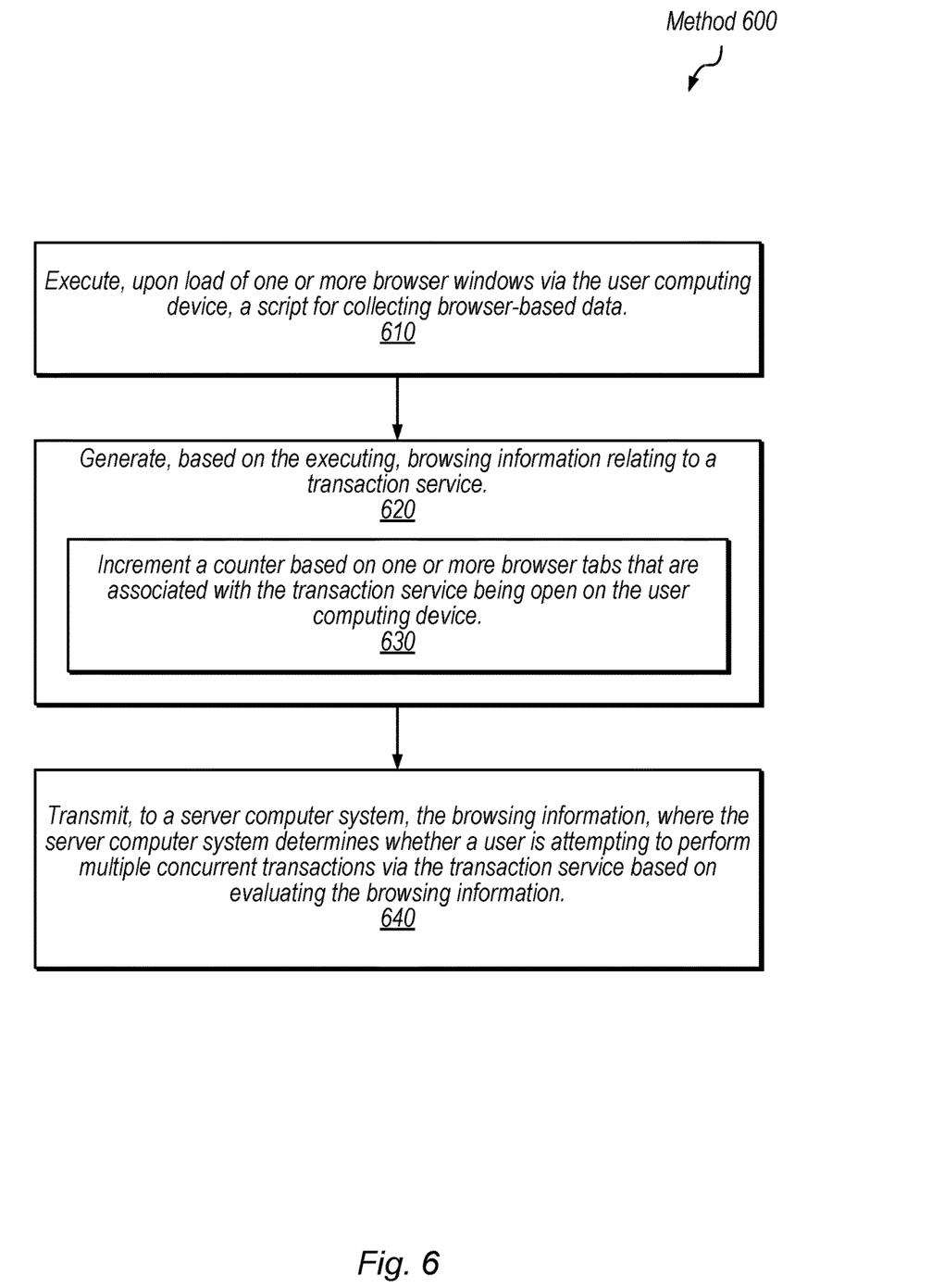
FIG. 6 is a flow diagram illustrating a method for collecting browser-based data by executing a script upon load of a browser window via a user computing device, according to some embodiments.

FIG. 6 is a flow diagram illustrating a method for collecting browser-based data by executing a script upon load of a browser window via a user computing device, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The following elements may be performed by user computing device 120, for example.

At 610, in the illustrated embodiment, a user computing device executes, upon load of one or more browser windows via the user computing device, a script for collecting browser-based data.

At 620, the user computing device generates, based on the executing, browsing information relating to a transaction service. In some embodiments, generating the browsing information includes assigning, based on the browser-based data indicating multiple opened browser tabs having matching uniform resource locators (URLs), unique identifiers to respective ones of the multiple opened browser tabs. In some embodiments, generating the browsing information further includes updating, based on a number of unique identifiers assigned to the multiple opened browser tabs, the counter, where the assigning and the updating are performed prior to transmitting the browsing information At 630, the user computing device generates the browsing information by incrementing a counter based on one or more browser tabs that are associated with the transaction service being open on the user computing device. In some embodiments, incrementing the counter is performed based on a user opening multiple browser tabs in a browser window. For example, if a user opens three tabs in a first browser window and one tabs in a second browser window, then the user computing device may generate two different counters with the values three and one and transmit these count values to the server computer system.

At 640, the user computing device transmits, to a server computer system, the browsing information, wherein the server computer system determines whether a user is attempting to perform multiple concurrent transactions via the transaction service based on evaluating the browsing information. In some embodiments, the user computing device transmits a request to authorize multiple concurrent transactions, where the multiple concurrent transactions are being attempted within a threshold amount of time.

Example Computing Device

Figure 7:
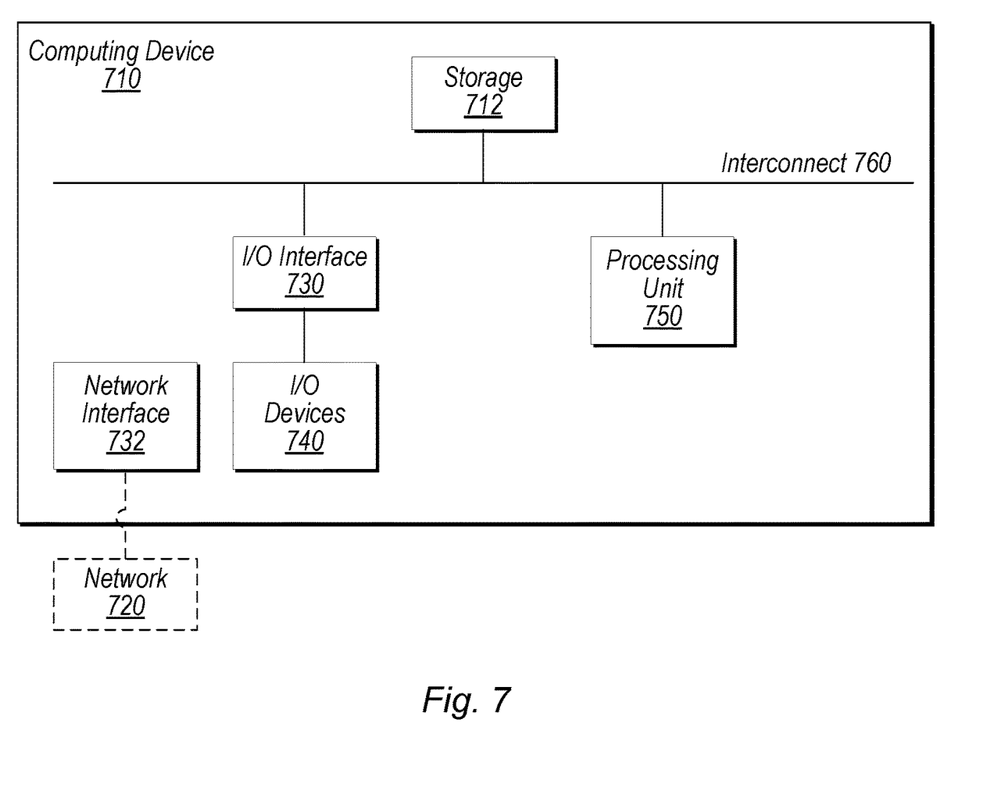
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). For example, database 370 is one example of storage subsystem 712 that is usable by processing unit 750. Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a server computer system, browsing information for a device of a user, wherein the browsing information relates to a transaction service;
   incrementing, by the server computer system, a counter based on a number of unique identifiers assigned to multiple browser tabs opened in a browser window by the user and indicated in the browsing information;
   caching, by the server computer system, the browsing information for the user device, including caching the counter;
   receiving, by the server computer system, a request to authorize two or more transactions via the transaction service;
   evaluating, by the server computer system, the cached browsing information to determine whether the user is attempting to perform multiple concurrent transactions via the transaction service, wherein the evaluating includes:
      determining that at least two uniform resource locators (URLs) executed via at least two different browser tabs correspond to the transaction service;
      determining transaction types associated with the at least two URLs; and
      determining whether the transaction types for the at least two URLs are the same; and
   transmitting, by the server computer system to the device of the user based on the evaluating an authorization decision for the request.

2. The method of claim 1, wherein the server computer system determines that the multiple transactions are concurrent based on the transactions being attempted simultaneously or near-simultaneously.

3. The method of claim 1, wherein the evaluating further includes:
   incrementing the counter based on the user opening a new browser tab in the browser window; and based on the counter satisfying a tab threshold, evaluating a set of transaction authorization criteria associated with the transaction service.

4. The method of claim 3, wherein the evaluating further includes:
decrementing the counter based on at least one of: the user closing a tab that was open in the browser window or a session timeout in an open tab.

5. The method of claim 1, wherein the authorization decision indicates, based on the transaction types for the two URLs being the same, that the request for the two or more transactions is denied.

6. The method of claim 1, wherein the received browsing information is received from a script running on the user device.

7. The method of claim 6, wherein the evaluating further includes:
determining, based on a subset of an expected set of information missing from the cached browsing information, that the script was not run on at least one of the multiple opened browser tabs, wherein the authorization decision for the request indicates that the request is denied based on the script failing to run.

8. The method of claim 1, wherein the request is for at least two transactions, the method further comprising:
approving, by the server computer system, the request to authorize the at least two transactions, wherein the request is approved based on the cached browsing information indicating that the at least two transactions are initiated from two different browser windows having URLs that do not match.

9. The method of claim 1, further comprising:
storing, by the server computer system, the cached browsing information in a database, wherein the information stored in the database is used for statistical analysis of the two or more transactions requested by the user device.

10. A non-transitory computer-readable medium having instruction stored thereon that are executable by a server computer system to perform operations comprising:
receiving browsing information for a device of a user, wherein the browsing information relates to a transaction service and is received from a script running on the user device;
incrementing a counter based on a number of unique identifiers assigned to multiple browser tabs opened in a browser window by the user and indicated in the browsing information;
caching the browsing information for the user device, including caching the counter;
receiving a request to authorize two or more transactions via the transaction service;
evaluating the cached browsing information to determine whether the user is attempting to perform multiple concurrent transactions via the transaction service, wherein the evaluating includes:
determining whether the user has multiple browser tabs open with the transaction service;
determining that at least two uniform resource locators (URLs) executed via at least two different browser tabs correspond to the transaction service;
determining transaction types associated with the at least two URLs; and
determining whether the transaction types for the at least two URLs are the same; and
transmitting, to the device of the user based on the evaluating, an authorization decision for the request.

11. The non-transitory computer-readable medium of claim 10, wherein the evaluating further includes, based on determining that the user has multiple browser tabs open with the transaction service, determining whether the user is attempting to perform multiple transactions via the multiple browser tabs simultaneously or near-simultaneously.

12. The non-transitory computer-readable medium of claim 10, wherein the evaluating includes:
determining whether multiple open browser tabs that are associated with the transaction service are concurrent based on the transactions being attempted simultaneously or near-simultaneously.

13. The non-transitory computer-readable medium of claim 10, wherein the request is for at least two transactions, the operations further comprising:
approving, based on the request being for two transactions, the request, wherein the request is approved based on the cached browsing information indicating that the at least two transactions are initiated from two different tabs in a single browser window executing two different URLs.

14. The non-transitory computer-readable medium of claim 11, wherein the request is for multiple transactions, the operations further comprising:
identifying that at least two URLs executed via two different browser tabs are the same;
determining that the multiple transactions are attempted simultaneously or near-simultaneously; and
denying, based on the identifying and the determining, the request for the multiple transactions.

15. The non-transitory computer-readable medium of claim 10, wherein the script is run on the user device upon load of one or more browser windows.

16. The non-transitory computer-readable medium of claim 15, wherein the evaluating further includes:
determining, based on a subset of an expected set of information missing from the cached browsing information, that the script was not run on at least one of the one or more browser windows, wherein the operations further comprise:
denying, based on the determining, the request to authorize two or more transactions.

17. The non-transitory computer-readable medium of claim 10, the operations further comprising:
storing the cached browsing information in a database; and
performing statistical analysis of the two or more transactions requested by the user device based on the information stored in the database.

18. A method, comprising:
executing, by a user computing device upon load of one or more browser windows via the user computing device, a script for collecting browser-based data;
generating, by the user computing device based on the executing, browsing information relating to a transaction service, wherein the generating includes:
assigning, based on the browser-based data indicating multiple opened browser tabs having matching uniform resource locators (URLs), unique identifiers to respective ones of the multiple opened browser tabs;
incrementing, based on a number of unique identifiers assigned to the multiple open browser tabs, a counter; and
transmitting, by the user computing device to a server computer system, the browsing information, wherein the browsing information is cached by the server computer system;

transmitting, by the user computing device to the server computer system, a request to authorize two or more transactions; and receiving, by the user computing device from the server computer system, an authorization decision for the request, wherein the server computer system generates the decision based on evaluating the cached browsing information, including determining whether a user is attempting to perform multiple concurrent transactions via the transaction service based on determining whether transaction types associated with at least two different uniform resource locators (URLs) executed via at least two different browser tabs corresponding to the transaction service are the same.

19. The method of claim 18, wherein generating the browsing information further includes:

assigning, based on the browser-based data indicating two or more newly opened browser tabs having matching URLs, unique identifiers to respective ones of the newly opened browser tabs; and updating, based on a number of unique identifiers assigned to the respective ones of the newly opened browser tabs, the counter; and transmitting, to the server computer system, the updated counter.

20. The method of claim 18, wherein the transmitted request is for multiple concurrent transactions being attempted simultaneously or near-simultaneously.

* * * * *